(12) United States Patent
Farrell et al.

(10) Patent No.: US 10,932,556 B2
(45) Date of Patent: Mar. 2, 2021

(54) SYSTEMS AND METHODS FOR ASSOCIATING PERSONAL CARE DEVICE ATTACHMENTS WITH PARTICULAR USERS

(71) Applicant: KONINKLIJKE PHILIPS N.V., Eindhoven (NL)

(72) Inventors: Nathan Farrell, Kirkland, WA (US); Jessica Lee Schroeder, Shoreline, WA (US); Adriaan Van Den Brand, Eindhoven (NL); Vincent Jeanne, Migne Auxances (FR)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/493,502

(22) PCT Filed: Mar. 7, 2018

(86) PCT No.: PCT/EP2018/055525
§ 371 (c)(1),
(2) Date: Sep. 12, 2019

(87) PCT Pub. No.: WO2018/166852
PCT Pub. Date: Sep. 20, 2018

(65) Prior Publication Data
US 2020/0029680 A1 Jan. 30, 2020

Related U.S. Application Data

(60) Provisional application No. 62/625,408, filed on Feb. 2, 2018, provisional application No. 62/472,912, filed on Mar. 17, 2017.

(51) Int. Cl.
*A46B 15/00* (2006.01)
*H04L 29/08* (2006.01)
*G08B 7/06* (2006.01)

(52) U.S. Cl.
CPC ...... *A46B 15/0044* (2013.01); *A46B 15/0085* (2013.01); *G08B 7/06* (2013.01); *H04L 67/306* (2013.01); *A46B 2200/1066* (2013.01)

(58) Field of Classification Search
CPC ......... A61C 19/04; A61C 17/22; A61C 15/04; A61C 17/221; A46B 15/0006;
(Continued)

(56) References Cited

U.S. PATENT DOCUMENTS 7,596,827 B1 10/2009 Puneet
9,757,065 B1 * 9/2017 Suri ..................... A61B 5/0022
(Continued)

FOREIGN PATENT DOCUMENTS

| CN | 105596104 A | 5/2016 |
|---|---|---|
| WO | 2012020165 A1 | 2/2012 |
| WO | 2016067151 A1 | 5/2016 |

OTHER PUBLICATIONS

PCT/2018/055525 ISR & Written Opinion, dated Jun. 21, 2018. 12 Page Document.

*Primary Examiner* — Brian E Miller

(57) ABSTRACT

A method and system for identifying an attachment of a personal care device (10). The method includes attaching an attachment (14) containing a memory (16) to a body portion (12) of a personal care device. The personal care device is powered up. Data is retrieved from the memory of the attachment. Information about the attachment attached to the personal care device is extracted from the retrieved data, the information including at least an association of the attachment to a specific user. An output characteristic of a status indicator (30) of the personal care device is associated with the ID (22) of the attachment. The status indicator is
(Continued)

operated in accordance with the output characteristic when the attachment is coupled to the body portion of the personal device.

14 Claims, 5 Drawing Sheets

(58) Field of Classification Search
CPC ............ A46B 15/0008; A46B 15/0014; A46B 15/0071; A46B 15/0081; A46B 2200/108; A46B 2200/1066; A46B 15/0012; A46B 15/0044; A46B 15/0004; A46B 5/0095; A46B 9/04; A46B 5/026; A61B 5/053; A61B 5/682; A61B 5/7257; G09B 19/0084
See application file for complete search history.

(56) References Cited

U.S. PATENT DOCUMENTS

| | | | |
|---|---|---|---|
| 10,242,566 B2 * | 3/2019 | Schiebahn | G06Q 30/06 |
| 10,282,976 B2 * | 5/2019 | Pfenniger | A61C 17/224 |
| 10,349,733 B2 * | 7/2019 | Serval | A46B 15/0012 |
| 10,582,764 B2 * | 3/2020 | Gatzemeyer | A46B 9/04 |
| 10,588,400 B2 * | 3/2020 | Straka | A46B 15/0006 |
| 10,595,627 B1 * | 3/2020 | Laurent | A61C 17/0211 |
| 10,647,011 B2 * | 5/2020 | Robinson | B26B 21/4081 |
| 2003/0101526 A1 | 6/2003 | Hilscher et al. | |
| 2003/0115694 A1 | 6/2003 | Pace | |
| 2005/0044646 A1 | 3/2005 | Peretz et al. | |
| 2007/0050931 A1 | 3/2007 | Jimenez et al. | |
| 2008/0109973 A1 * | 5/2008 | Farrell | A46B 15/0044 15/4 |
| 2008/0146887 A1 | 6/2008 | Rao et al. | |
| 2013/0071807 A1 * | 3/2013 | Doll | A61C 17/222 433/27 |
| 2013/0125326 A1 * | 5/2013 | Schmid | A46B 15/0044 15/105 |
| 2013/0125327 A1 * | 5/2013 | Schmid | A46B 15/0044 15/105 |
| 2013/0137074 A1 * | 5/2013 | Meriheinae | A46B 15/0008 434/263 |
| 2014/0033034 A1 * | 1/2014 | Patel | A46B 15/0042 715/716 |
| 2014/0123420 A1 * | 5/2014 | Nanda | A46B 9/04 15/105 |
| 2014/0366288 A1 | 12/2014 | Grez et al. | |
| 2015/0230593 A1 * | 8/2015 | Doll | A46B 15/0006 702/19 |
| 2016/0143718 A1 * | 5/2016 | Serval | A46B 15/0008 15/22.1 |
| 2016/0220013 A1 * | 8/2016 | Barnes | A46B 15/0034 |
| 2017/0056685 A1 * | 3/2017 | Harvey | A61B 5/441 |
| 2017/0095070 A1 * | 4/2017 | Machiorlette | A46B 15/0002 |
| 2017/0303673 A1 * | 10/2017 | Van Gool | A61B 5/6898 |
| 2018/0126571 A1 * | 5/2018 | Rothschild | A61C 17/34 |
| 2018/0311062 A1 * | 11/2018 | Pathak | A61B 5/1114 |
| 2019/0167400 A1 * | 6/2019 | Barnes | A61N 5/0624 |
| 2020/0029680 A1 * | 1/2020 | Farrell | A46B 15/0085 |

* cited by examiner

|  | Dad | Mom | Son | Daughter |
| --- | --- | --- | --- | --- |
| Selected ID color | Red | Green | Pink | Blue |
| Brush head age | New | 43 Days | 60 Days | 74 Days |
| Light ring display | Red | Green | Pink | Blue |

FIG. 5

|  | Dad | Mom | Son | Daughter |
| --- | --- | --- | --- | --- |
| Selected ID color | Red | Green | Pink | Blue |
| Brush head age | New | 43 Days | 60 Days | 74 Days |
| Light ring display | Red | Green | Pink | Blue |

FIG. 6

SYSTEMS AND METHODS FOR ASSOCIATING PERSONAL CARE DEVICE ATTACHMENTS WITH PARTICULAR USERS

CROSS-REFERENCE TO PRIOR APPLICATIONS

This application is the U.S. National Phase application under 35 U.S.C. §371 of International Application No. PCT/EP2018/055525, filed on Mar. 7, 2018, which claims the benefit of U.S. Provisional Patent Application No. 62/625,408, filed Feb. 2, 2018 and U.S. Provisional Patent Application No. 62/472,912, filed on Mar. 17, 2017. These applications are hereby incorporated by reference herein.

FIELD OF THE INVENTION

The present disclosure is directed generally to personal care products, and more specifically to methods and systems for associating personal care device attachments with particular users.

BACKGROUND

Personal care devices, such as electric toothbrushes, skin cleaners, personal groomers, and shavers, have been shown to increase the efficacy of a cleaning session and are preferred by many users. Personal care devices may have a reusable body portion that receives a replaceable attachment, and may include operating components such as a motor or other actuator, arranged to drive the attachment in an oscillating, reciprocating, or other pattern. The attachment is typically a removable cleaning or grooming mechanism that may come into direct contact with the user, such as a toothbrush head, a shaver cutting device, a grooming cutting head or a skin-cleaning brush head.

For hygienic and user desirability reasons, the attachments are generally personal to a specific individual, while the body portion may be shared amongst users. For example, an entire family may share an electric tooth brush handle, with each member of the family having his or her own personal toothbrush head. However, by sharing the body portion of the personal care device and frequently swapping between attachments, each user risks inadvertently using the attachment of another user.

There is a need for personal care devices that readily indicate to users whether an intended attachment is being used with the personal care device.

SUMMARY OF THE INVENTION

The present disclosure is directed to inventive methods and systems for personal care devices that can detect whether a particular removable attachment, such as a toothbrush head, face cleansing brush or shaver cutting device, has been installed on the personal care device, and that can associate each different attachment to a particular individual. The attachments are able to be coupled to a body portion of the personal care device. Each of the attachments includes a memory element such as a radiofrequency identification (RFID) tag, near-field communication (NFC) tag, or the like, which can be read by the personal care device in order to distinguish between different attachments. The personal care device includes a status indicator that can operate according to a variety of different output characteristics (e.g., a light that can illuminate in different colors to indicate which attachment is currently being used). The personal care device associates the attachment with different output characteristics of the status indicator, such that the output of the status indicator changes with respect to the particular attachment coupled to the personal care device. In this way, a reusable body portion of the personal care device can be commonly shared by a number of different users, with each user conveniently able to readily verify that they are using the correct attachment, as indicated by the status indicator.

Generally, in one aspect, a method for identifying an attachment of a personal care device is provided. The method includes the steps of attaching an attachment containing a memory to a body portion of a personal care device; powering up the personal care device; retrieving data from the memory of the attachment; extracting, from the retrieved data, at least an identification (ID) of the attachment; associating an output characteristic of a status indicator of the personal care device to the ID of the attachment; and operating the status indicator in accordance with the output characteristic when the attachment is coupled to a body portion of the personal device.

According to an embodiment, the method further includes sending a synchronization signal query to detect the whether the attachment is physically coupled to the personal care device. According to an embodiment, the data includes information about the specific user, preferences set by the specific user, usage history of the attachment, usage history of the specific user, or a combination including at least one of the foregoing.

According to an embodiment, the status indicator includes one or more light sources and the output characteristics include emitting a plurality of different colors from the one or more light sources. According to an embodiment, the status indicator is configured to produce audio, visual, or haptic feedback signals and the output characteristics may be permanently or temporarily provided to the user.

According to an embodiment, the associating includes indirectly assigning the output characteristic to the ID of the attachment by associating the ID to a user number or user profile that is associated with the output characteristic. According to an embodiment, the personal care device is an electric toothbrush and the attachment includes a brush head.

According to an embodiment, the method further includes communicating with the personal care device using a remote device separate from the personal care device. According to an embodiment, the remote device includes a smartphone, a charging unit for the personal care device, a computer, a tablet, a smartwatch, a mobile computing device, a server, or a combination including at least one of the foregoing. According to an embodiment, the remote device includes a software application and the method further comprises communicating with the personal care device for retrieving the data.

Generally, in one aspect, a method for associating a removable attachment of a personal care device with an individual user is provided. The method includes retrieving data from a memory of the removable attachment, the data including at least an identification (ID) of the attachment; assigning an output characteristic of a status indicator of the personal care device to the ID of the attachment; and operating the status indicator in accordance with the output characteristic when the removable attachment is coupled to a body portion of the personal device.

Generally, in one aspect, a personal care device is provided. The personal care device includes a plurality of removable attachments, each of the attachments having a memory on which data is stored that includes at least an identification (ID) of each of the attachments, each of the IDs differing from each other; and a status indicator operational according to multiple different output characteristics; wherein the personal care device is configured to associate a different one of the output characteristics to each of the IDs, and to operate the status indicator in accordance with each of the output characteristics when a corresponding one of the attachments is coupled to a body portion of the personal care device.

According to an embodiment, the status indicator includes one or more light sources and the output characteristics include emitting differently colored light with the one or more light sources, with each color associated with a different user.

Generally, in one aspect, a system comprising the personal care device according to any embodiment disclosed herein is provided. The personal care device also includes a remote device having a software application installed thereon, the software application configured to communicably interface with the personal care device for retrieving the data, rewriting the data, or a combination including at least one of the foregoing.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5 is a table illustrating operation of a personal care device system according to one example scenario presented herein, in which a status indicator simultaneously indicates both an associated user and a usage history of attachments.

FIG. 6 is a table illustrating operation of a personal care device system according to one example scenario presented herein, in which a status indicator simultaneously indicates both an associated user and a usage history of attachments.

DETAILED DESCRIPTION OF EMBODIMENTS

The present disclosure describes various methods and systems for associating consumables, workpieces, or other attachments (collectively, "attachments") used with a personal care device with specific individuals or users. The attachments are able to be coupled to a body portion of the personal care device. Each of the attachments includes a memory element such as a radiofrequency identification (RFID) tag, near-field communication (NFC) tag, or the like, which can be read by the personal care device in order to distinguish between different attachments. The personal care device includes a status indicator that can operate according to a variety of different output characteristics (e.g., a light that can illuminate in different colors to indicate which attachment is currently being used). The personal care device associates the attachment with different output characteristics of the status indicator, such that the output of the status indicator changes with respect to the particular attachment coupled to the personal care device. In this way, a reusable body portion of the personal care device can be commonly shared by a number of different users, with each user conveniently able to readily verify that they are using the correct attachment, as indicated by the status indicator.

Figure 1:
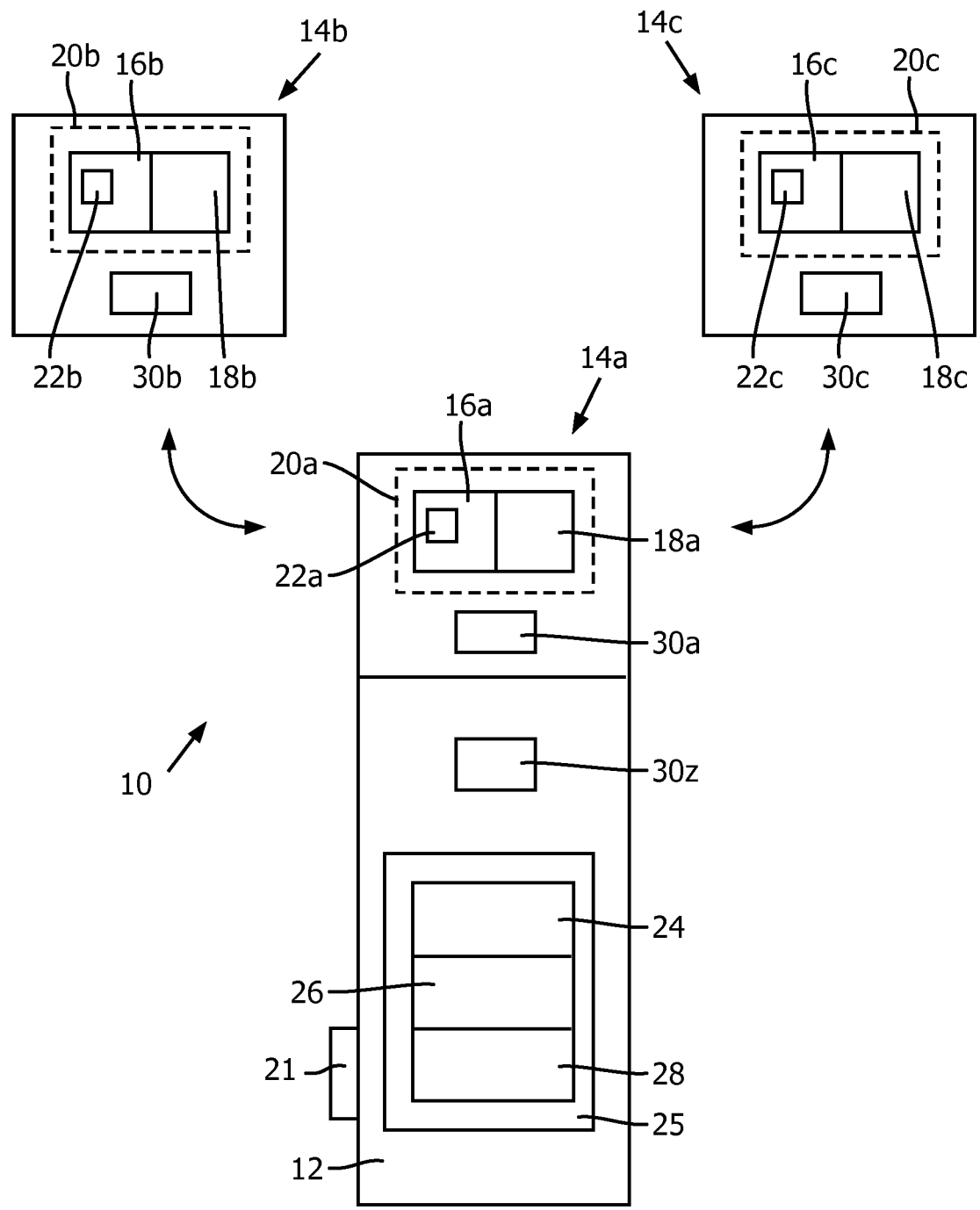
FIG. 1 schematically illustrates a personal care device system according to one embodiment disclosed herein.

Referring to FIG. 1, in one embodiment, a personal care device 10 is schematically illustrated, having a body portion 12 and one or more removable attachments $14_n$ that are detachably couplable to the body portion 12. To facilitate discussion, the attachments 14 are provided with alphabetic suffixes ('a', 'b', 'c', etc.) to facilitate discussion with respect to individual ones of the attachments 14. For example, in FIG. 1, the attachment 14a is shown coupled to the body portion 12, while arrows indicate that the attachment 14a is swappable or replaceable with the attachments 14b or 14c. It is to be appreciated that any number of the attachments $14_n$ may be utilized. With respect to the disclosure herein, reference to a component without alphabetic suffix (e.g., "the attachment 14" or "the attachments 14"), refers generally to any or all of embodiments of that component sharing that reference numeral (e.g., the attachments 14a, 14b, and 14c), regardless of alphabetic suffix.

The attachments 14 may be understood to be, and/or interchangeably referred to as, a consumable, workpiece, disposable, or replaceable portion of the personal care device 10 that is intended to be regularly discarded, removed, replaced, or swapped out, while the body portion 12 is a "permanent" portion of the personal care device 10 that is intended to be reused throughout the entire life of the personal care device 10. For example, the body portion 12 may comprise a handle or holder for the attachment 14, and/or may contain an electronic and/or mechanical components, such as a motor, actuator, battery, computer controller, or the like for operating the personal care device 10. As will be better appreciated in view of the disclosure herein, the currently disclosed embodiments may be particularly useful for multi-use attachments, that is, attachments that are intended to be used a plurality of times, but which are regularly swapped out for other attachments. For example, in one embodiment, the personal care device 10 is an electric toothbrush, the body portion 12 is an electric toothbrush handle, and the attachment 14 is a replaceable brush head (e.g., which may be replaced every three months or so). In another embodiment the personal care device 10 is a razor, the body portion 12 is a razor handle, and the attachment 14 is a razor cartridge.

In some instances, it may be desired for the body portion 12 of the personal care device 10 to be commonly shared by a number of different users (e.g., a family), with each user having his or her own attachment 14. For example, the attachment 14a could belong to a first user (e.g., "mom"), the attachment 14b could belong to a second user (e.g., "dad"), and the attachment 14c could belong to a third user (e.g., "daughter"). In this way, each of the users does not need to purchase or acquire a separate one of the body portions 12 to use the personal care device 10. The term "user" may be used herein interchangeably with the term "owner" to indicate the person, individual, or entity to which each attachment is associated.

Each of the attachments 14 includes a memory 16 for storing data related to the attachment or the user using the attachment and a communication module 18 for enabling read and/or write access to the memory 16 from or to other devices. Memories 16a, 16b, and 16c and communication modules 18a, 18b, and 18c are included respectively in the attachments 14a, 14b, and 14c in FIG. 1. The memory 16 may take any form of electronic storage media, and may be implemented by an integrated circuit or other means. The communication module 18 may include an antenna, receiver, transmitter, or radio utilizing any known or discovered technology. Together, the memory 16 and the communication module 18 may form, or be referred to as a tag 20 (tags 20a, 20b, and 20c shown in FIG. 1), such as a radio-frequency identification (RFID) tag, a near field communication (NFC) tag, etc. It is to be appreciated that any other communication technology may be utilized, such as Bluetooth, Wi-Fi, cellular technologies, radio transmissions, magnetic fields, optical communication, etc., or wired communication if the attachment 14 includes electrical contacts that form a physical connection when coupled to another device such as the body portion 12.

The data on the memory 16 includes at least a code, number, or other identifier, identification, or identifying element designated generally as an ID or ID element 22 (with IDs 22a, 22b, and 22c shown in FIG. 1), which enables the corresponding one of the attachments 14 to be uniquely identified by reading its ID. For example, the IDs 22a, 22b, and 22c can be data used by a device reading the IDs to distinguish between and/or identify each of the attachments 14. The ID elements 22 may be implemented as part of the manufacturing process of the attachment 14, the memory 16, and/or the tag 20, such as a universally unique identifier (UUID), or assigned to the memory 16 when in operation (e.g., such as by a controller of the body portion 12 or a software application of a remote device, as described in more detail below).

In this way, each specific attachment can be identified by its ID element 22 (and thereby associated with a specific individual), such that data pertaining to that attachment and that user can be collected and tracked separately by the personal care device 10 (e.g., storing the data in the memory 16 for the particular attachment 14, or in memory of the body portion 12). Advantageously, this enables tracking of user information, such as the user's name or operational preferences (e.g., speed, duration, frequency, or other operational parameters of the personal care device 10), as well as usage data, such as the total amount of time (e.g., number of minutes) that the attachment 14 has been used, or the number of cleaning sessions for which the attachment 14 has been used.

The body portion 12 of the personal care device 10 may include a controller 25, which includes one or one computer components or modules that enable the controller 25 to interface with the tag 20 of the attachment 14, and/or to control operation of the personal care device 10 in response to an input, for example user input such as turning on the device, according to one more modes of operation. For example, the body portion 12 may include a user input 21 in the form of a button, switch, knob, dial, etc., which may enable a user to power on or off the personal care device 10, to change a mode of operation of the personal care device 10, etc. The controller 25 may comprise a processor 24, a memory 26, a communication module 28, and any other hardware or software components that facilitate the operation of the personal care device 10.

The processor 24 may take any suitable form, such as a microcontroller, plural microcontrollers, circuitry, a single processor, or plural processors configured to execute software instructions. The memory 26 may take any suitable form or forms, including a non-volatile memory and/or a volatile memory such as random access memory (RAM). The non-volatile memory may include read only memory (ROM), flash memory, a hard disk drive (HDD) or a solid state drive (SSD). The memory 16 may be used by the processor 24 for the temporary storage of data during its operation. Software such as an operating system, firmware, or other application may be installed on the memory 26. The software may contain code or instructions which, when executed by the controller 25, controls operation of the hardware components of the personal care device 10. The communication module 28 is arranged to enable signal communication between the body portion 12 and the communication module 18 of the attachment 14, as well as with any other remote devices as discussed in more detail below. Thus, akin to the communication module 18, the communication module 28 can be any module, device, or means capable of transmitting a wired or wireless signal, including but not limited to a Wi-Fi, Bluetooth, NFC, radio, magnetic, optical, and/or cellular module.

The personal care device 10 can also include an indicator 30 or indicating element that is configured to indicate to users which of the attachments 14 is connected to the body portion 12, and which may be referred to herein interchangeably as a status indicator, a user indicator, or simply indicator. The indicator 30 may be included on the body portion 12 (e.g., the indicator 30z) or on each of the attachments 14 (e.g., the indicators 30a, 30b, and 30c). The personal care device 10 can determine which of the attachments 14 is connected to the body portion 12 by reading the ID element 22 of the attachment 14 when the attachment 14 is coupled to the body portion 12 (e.g., using the controller 25) and operating the indicator 30 with an output characteristic that corresponds to the ID element 22.

In one embodiment, the indicator 30 is or includes one or more lights that illuminate in different colors corresponding to different users, or flash in different patterns. If the indicator 30 includes a light source, it can also include one or more elements to transform the output characteristics of the light, such as a filter. In one embodiment, the indicator 30 is or includes a speaker that plays a different sound or series of sounds for different users. The indicator 30 could also be or include a display unit or screen that displays a custom message (e.g., the user's name), a shape, a symbol, pattern, or any other visual indication that a user could use to distinguish their specific attachment from other attachments 14. In one embodiment, the indicator 30 includes electronic ink (or "e-ink"). The output characteristics may be made available to the user permanently (e.g., constantly displayed while the personal care device 10 is in use and/or available even when the personal care device 10 is not in use) or temporarily (e.g., blinking, pulsing, or intermittently available during use, or unavailable when the personal care device 10 is not use). In one embodiment, the indicator is a vibration unit or other mechanism to that provides haptic feedback in a specific pattern or frequency corresponding to each of its different output characteristics. Advantageously, by each user selecting or otherwise knowing which output characteristic is assigned to their attachment, each user can immediately recognize and confidently establish whether their attachment is coupled to the personal care device 10 based on the output of the indicator 30. In one embodiment, the indicator 30 becomes locked or set once it is associated with a specific user.

Figure 2A:
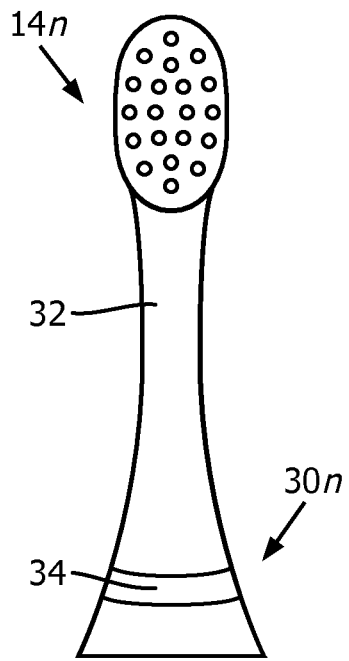
FIGS. 2A-2C illustrate attachments in the form of toothbrush heads in accordance with one embodiment disclosed herein.
Figure 2B:
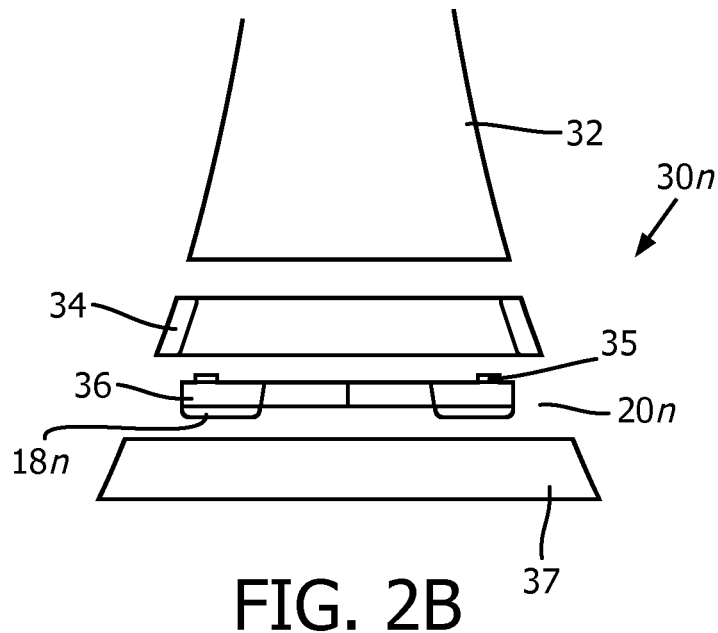
Figure 2C:
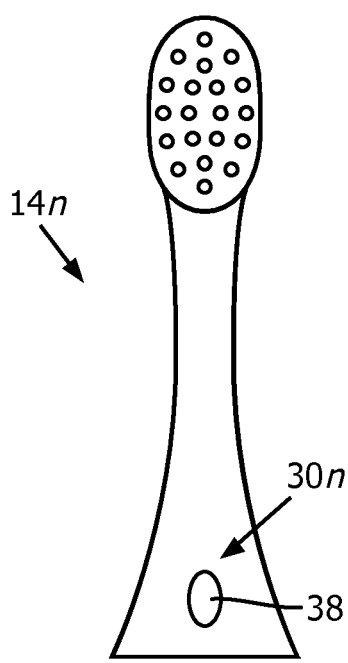

An attachment $14_n$ having an indicator $30_n$ is illustrated in FIGS. 2A-2B according to one embodiment disclosed herein. In this embodiment, the attachment $14_n$ is a brush head (which may be referred to as the brush head $14_n$) for an electric toothbrush and the indicator $30_n$ includes a light assembly (which may be referred to as light assembly $30_n$). The brush head $14_n$ includes a neck 32 having a translucent ring 34 of the light assembly $30_n$, through which light, e.g., colored light, can be illuminated. As shown in FIG. 2B, the light assembly $30_n$ may include one or more light sources 35 (e.g., LEDs) mounted on a printed circuit board (PCB) 36. A cap 37 can be used to secure the light assembly $30_n$ in place. In this embodiment, the printed circuit board 36 may additionally include a communication module $18_n$ in the form of a coil antenna mounted to the PCB 36. In addition to the communication module $18_n$, the PCB 36 may include memory (not illustrated), such that the light assembly $30x$ doubles as or is integrated with the tag $20_n$ for the brush head $14_n$. The construction of the attachment $14y$ in FIG. 2C may generally correspond to the brush head $14_n$ shown in FIG. 2A, except that it includes a window 38 instead of the translucent ring 34.

The association between the IDs 22 and the corresponding output characteristics of the indicator 30 (i.e., which output characteristic corresponds to each of the IDs 22) can be stored in either the memory 16 for each particular attachment 14 or in the memory 26 for all of the attachments 14 registered with or connected to the body portion 12. For example, the memories 16 and/or 26 may contain a re-writeable location dedicated to storing this association between the IDs 22 and the output characteristics. This memory location could be associated physically or digitally with the IDs 22 of the attachments 14. For example, the memory 26 may include a database, table, or array that associates each of the IDs 22 with different output characteristics for the indicator 30. It is also noted that if the attachment 14 includes the indicator 30, the attachment 14 may additionally include a processor, such as the processor 24, which effectively forms a controller (akin to the controller 25) for operating the indicator 30. For example, adding a processor to the attachment 14 may enable backwards compatibility with body portions 12 not configured to operate an indicator, but may increase the cost of the attachments. In such embodiments, the attachment 14 could be interfaced with using a remote device such as a changing unit or smartphone, as discussed in more detail below with respect to FIG. 4.

Instead of associating an output characteristic of the status indicator directly with the ID element 22 of the attachments 14, each user may include a user account, a user number, or a user profile that is also monitored by the personal care device 10. For example, a user could have a profile that includes a plurality of different ones of the IDs 22, such that the profile as a whole, and thus all of the IDs 22 associated with that profile, are associated with the desired output characteristic. In this way, the personal care device 10 may be configured to prevent or deny multiple different profiles to use the same output characteristic for the indicator 30. The different user profiles could be stored and tracked, for example, in the memory 26 of the body portion 12 or the memory 66 of the remote device 62. Embodiments in which the remote device 62 includes one or more computing devices in the cloud may be particularly advantageous for managing a plurality of different user profiles across one or even multiple personal care devices. That is, a user could use a software application (e.g., as discussed below) to manage their preferences and to view their usage data or historical records across any number of different attachments, body portions, or personal care devices.

Figure 3:
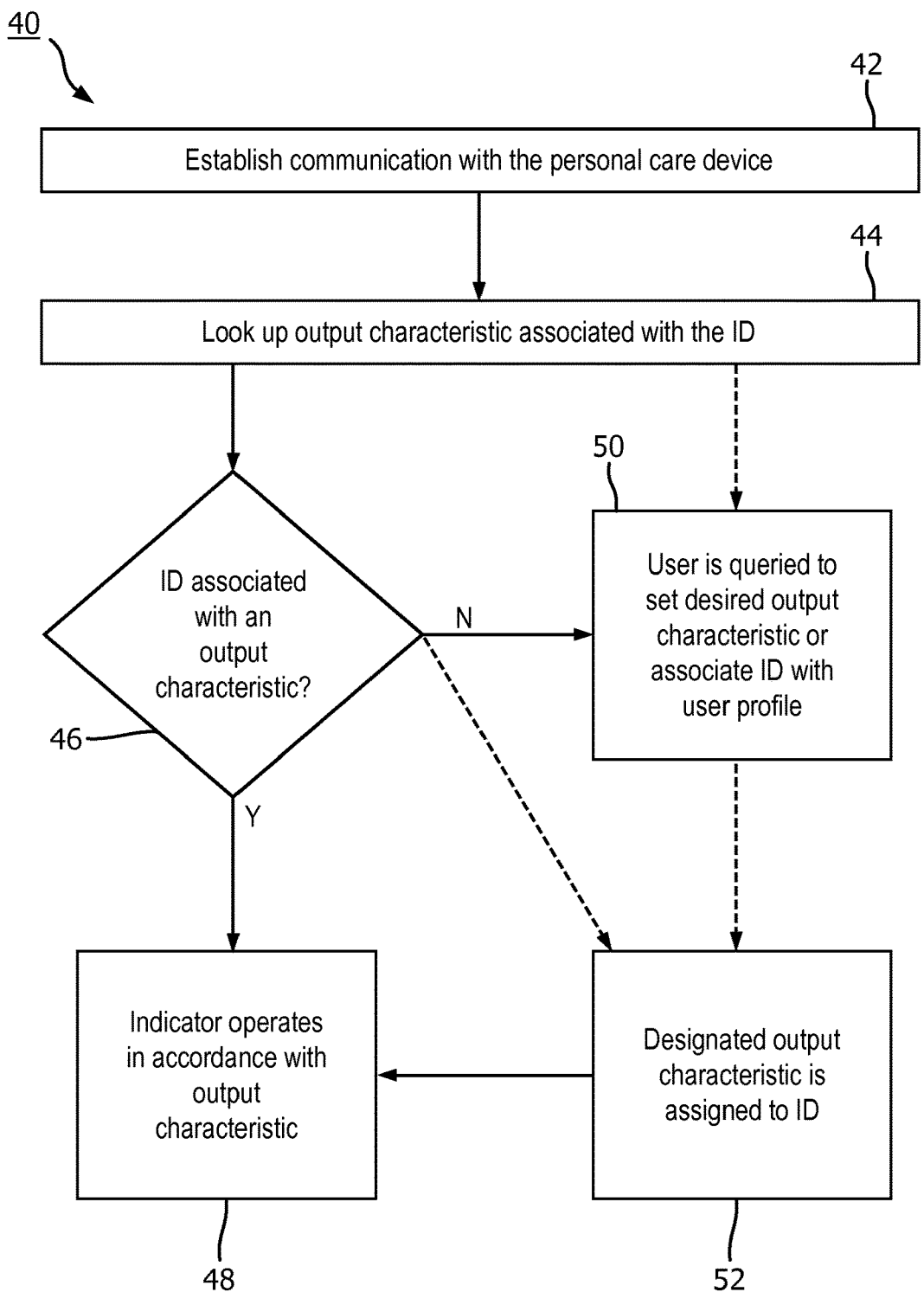
FIG. 3 is a flowchart of a method of operating a personal care device according to one embodiment disclosed herein.

A method 40 for operating a personal care device, e.g., the personal care device 10, is provided in FIG. 3. At a step 42, communication is established with the personal communication device in order to signal that the attachment 14 is connected to the body portion 12. For example, communication may be established by physically coupling or attaching the attachment 14 to the body portion 12 of the personal care device 10, by bringing the attachment 14 into proximity of the body portion 12, by connecting to the personal care device 10 with a remote device (e.g., as discussed with respect to FIG. 4 below). Communication may additionally or alternatively be established when the personal care device is turned on or activated by a user. As discussed above, once communication is established, the ID element 22 of the attachment 14 can be read (e.g., by the controller 25) and shared between the attachment 14, the body portion 12, and any remote devices, as applicable.

Next, the method 40 includes looking up the output characteristic associated with the ID (e.g., the ID element 22) of the attachment at a step 44. For example, the output characteristic may be looked up by the controller 25 in a database or array stored in the memory 26, or obtained with the ID element 22 if stored in the memory 16 of the attachment 14. In embodiments that utilize user numbers or profiles, then the output characteristic can be looked up in the step 44 by checking whether the ID element 22 is associated with any user numbers or profiles.

If the output characteristic has previously been associated with the ID (and/or a user profile that includes the ID), and thus can be found, then the method 40 proceeds through a step 46 to a step 48. At the step 48, the status indicator (e.g., the indicator 30) is operated in accordance with the output characteristic. If an output characteristic cannot be found associated with the ID at the step 46, then the method 40 proceeds to a step 50 and/or a step 52 before terminating at the step 48. The steps 50 and 52 may be considered or referred to as registering the attachment to the personal care device and may occur the first time an attachment is connected to the body portion, or at the request of the user as noted below.

In the step 50, it is optionally queried whether the user would like to set or select their desired output characteristic. Instead of directly setting the output characteristic, a user may be asked in the step 50 to associate the ID element 22 of the attachment 14 to a specific user number or profile, with the output characteristic set by the user number or profile. In one embodiment, a user is asked to both associate the ID with a user profile and to set a preferred output characteristic for that profile. For example, a user could be presented with a list of preset options, or the user could be presented with a field into which the user can input the relevant information (e.g., via the user input 21, a keyboard, mouse, touchscreen, etc.). As discussed in more detail below, input may be accomplished by an application installed on remote device in communication with the personal care device.

At the step 52, a designated output characteristic for the status indicator is assigned to the ID. As noted above, this designation may occur indirectly by associating the ID element 22 with a user number or profile instead of directly associating the ID element 22 with a specific output characteristic. The output characteristic, the ID element 22, the user number and/or other profile information could be stored as data in the memory 16 and/or the memory 26, as discussed above.

In one embodiment, e.g., if the personal care device is not configured to receive user input, the step 50 can be skipped (indicated by a dashed arrow) and the method proceeded immediately to the step 52, in which the personal care device (e.g., via the controller 25) automatically assigns an output characteristic to the ID (which could be directly, or indirectly by associating the attachment to a user number or profile). The controller 25 may be configured to check whether the output characteristic is already assigned to another ID and to prevent or deny the association of multiple IDs to the same output characteristic at the same time. In one embodiment, the controller 25 auto-increments the user number that it assigns to each successive attachment 14 that is coupled to the personal care device 10 having an ID that is unrecognized (or unregistered), with each user number corresponding to a different preset output characteristic.

Once the output characteristic is assigned to the ID (either directly or indirectly via a user number or profile), the method 40 proceeds to the step 48 and the status indicator (e.g., the status indicator 30) is operated in accordance with the designated output characteristic. Thus, by use of the method 40, if a user couples an attachment to a personal care device, the indicator 30 will indicate whether it is their attachment or not. In this way, inadvertent use of another user's attachment is thereby avoided.

Figure 4:
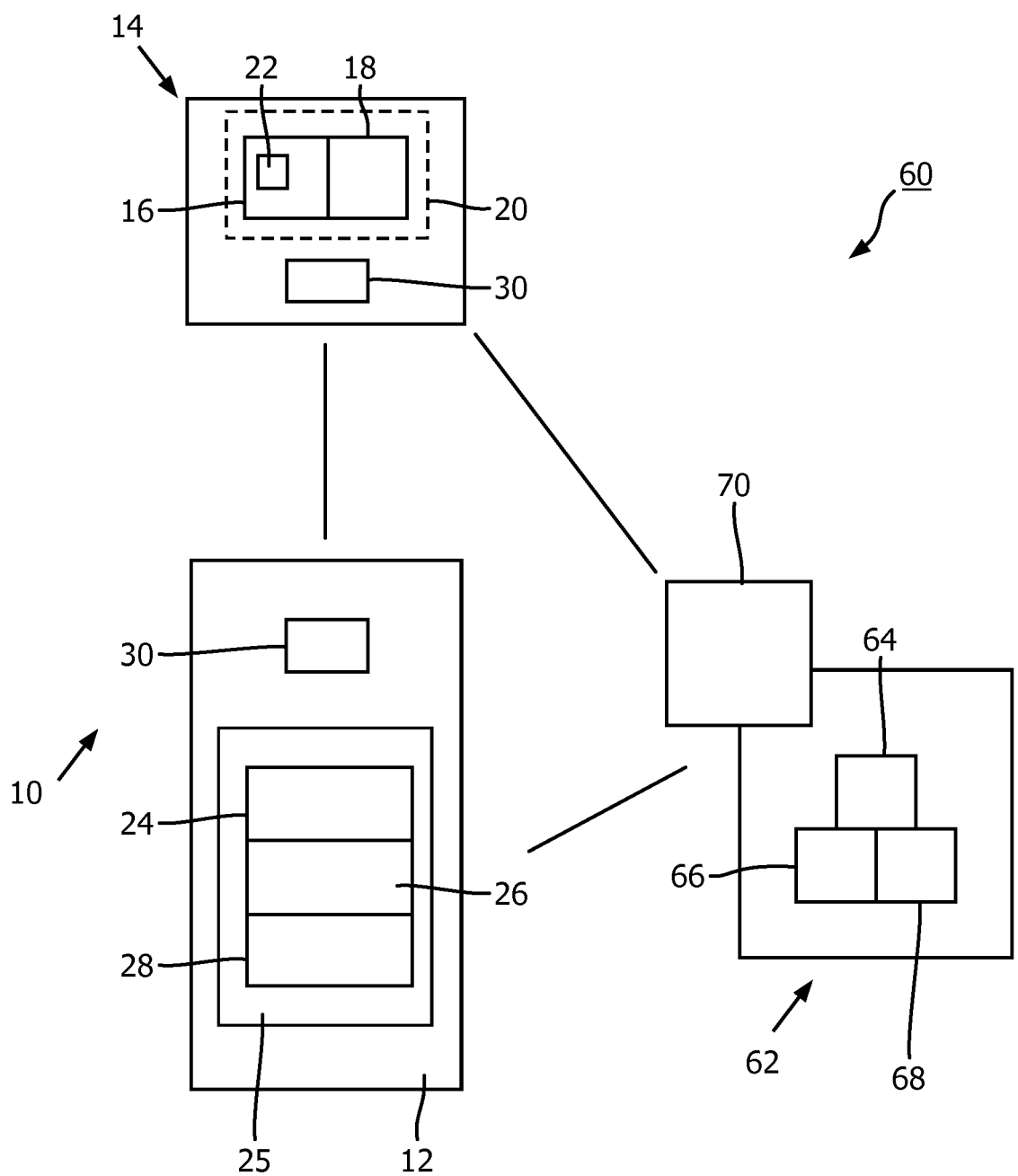
FIG. 4 schematically illustrates a system for operating a personal care device according to one embodiment disclosed herein.

A system 60 for operating a personal care device is illustrated in FIG. 4. In addition to the personal care device 10, the system 60 includes a remote device 62. The remote device 62 is a device that is separate from the personal care device 10, but used to facilitate certain functionality of the personal care device 10. According to an embodiment, the remote device 62 can be any device configured to or capable of receiving and processing information transmitted from personal care device 10, e.g., communicably compatible with the communication modules 18 and/or 28. For example, remote device may be a personal care device holder, base, or charging station, a mobile computing device such as a smartphone, smartwatch, or tablet, a computer, a server (e.g., in the cloud), or any other computerized device. To this end, the remote device 62 may include any requisite hardware and/or software, such as a processor 64 and a memory 66, generally arranged as discussed with respect to the other processors, memories, and communication modules discussed herein, or as otherwise known or discovered in the art. According to an embodiment, the remote device may also include a communications module 68, which can be any module, device, or means capable of receiving a wired or wireless signal, including but not limited to a Wi-Fi, Bluetooth, NFC, and/or cellular module.

In one embodiment, an application (or app) 70 is installed as software on the remote device 62 (e.g., in the memory 66), and arranged to facilitate a user in communicating with the attachments 14 and/or the body portion 12. With respect to FIGS. 3 and 4, it is to be appreciated that the application 70 of the remote device 62 may facilitate implementation of the method 40, particularly with respect to registration or re-registration of the IDs 22. For example, communication may be established in the step 42 between the application 70 and the attachment 14 or the body portion 12. The application 70 can request and receive the ID element 22 and/or the output characteristic associated with the ID element 22 in the step 44. In the event of initial registration, the method can proceed as normal to the step 46. However, the application 70 could alternatively be used to skip the step 46 and go directly to the step 52 to enable a user to re-register the attachment, or otherwise change or reassign the output characteristic associated with the ID element 22 of the attachment whenever so desired by the user.

If the application 70 is used, the querying in the step 50 may occur directly to the application 70 (as opposed to a query presented to the user on a display or the like) when the remote device 62 is in communication with the attachment 14 and/or the body portion 12, and the ID element 22 may be automatically assigned to the user profile associated with that application without user input. In one embodiment, the remote device 62 may include a plurality of different pegs or protrusions, or recesses or receptacles that are configured to receive the attachments 14 (e.g., a charging station of an electric toothbrush that has a number of designated features for holding multiple brush heads at once). In such an embodiment, the remote device 62 may be configured to automatically assign output to the IDs 22 characteristics (directly or indirectly via a user number or profile), based upon which peg/receptacle the attachment 14 is secured.

Use of a personal care device and/or system such as disclosed herein enables the ability for a specific individual user to associate with specific attachments used in conjunction with a personal care device. This provides not only a positive identification of which specific attachment is attached to the personal care device at any given time (e.g., via the status indicator 30), but the ability to collect and analyze data about the actual use of the personal care device by different users, even if the personal care device is being shared by multiple users each using different attachments.

In operation according to one embodiment, when a user turns on the personal care device 10, it powers up, and synchronizes electronically between the attachment, the body portion 12, and any applicable remote devices 62, e.g., by means of an electronic pulse query, and response from the attachment, such as described above. This will enable the personal care device 10 to obtain the ID element 22 and determine whether the body portion 12 is coupled to the attachment 14 and whether the attachment 14 is one that has been previously used with that personal care device 10 (e.g., according to the step 46). If the attachment has been previously used, the personal care device 10 can retrieve information history about that attachment, such as use history, and the profile of any user to which it has been associated, such as from the memory 26 and/or from the memory 66 if a remote device is utilized. If it is a new attachment that has not yet been used or associated with a specific user, the system can perform an automatic association, or seek input from the user to determine with respect to which user to associate the attachment, and any user preferences, such as LED color, etc. (e.g., as described in the steps 50 and 52). This association can be performed by a variety of methods, including but not limited to by means of the controller 25 in the personal care device 10, by the application 70 associated with the personal care device 10, on the remote device 62 such as on a smart phone, a server, or in the cloud. Then, on subsequent personal care device power-ups, the attachment will be recognized during synchronization, and associated with the already-associated user, and history about the attachment and the user, if appropriate. Any user-associated preferences would be implemented upon synchronization and recognition of the attachment.

In one embodiment, the status indicator 30 includes a programmable LED, which can be configured so that for "User 1", the LED in their attachment (e.g., the attachment 14a) will illuminate in a red color spectrum, while the attachment for "User 2" (e.g., the attachment 14b) will be configured to illuminate in a blue color spectrum when connected to the personal care device 10. Based on the color (output characteristic) of the LED (indicator 30), this enables a user, upon turning on the personal care device 10, to quickly determine whether the attachment 14 connected to the personal care device 10 is illuminated in the color associated with that user, or if the LED (indicator 30) indicates that the attachment 14 is associated with a different user. That is, if User 1 turns on the personal care device 10 and the LED of the indicator 30 is illuminated blue, rather than red, then User 1 would know that the connected attachment does not belong to them, but instead to User 2, and could switch out the attachment until they find the attachment that causes the indicator to illuminate their assigned color.

In one embodiment, a user must additionally provide some input to the personal care device in order to verify that they are the intended user (and thus prevent users from purposely ignoring the output of the indicator 30 and using attachments that are not theirs). For example, a user might need to provide a password, fingerprint scan, PIN, voice recognition, etc. In one embodiment, the application 70 is used to verify or authenticate the user. In one embodiment, if a user attempts to proceed with using the personal care device with an attachment that is associated with another user, a notification could be given to warn the user that the attachment is not one associated with them. In one embodiment, the personal care device could be configured to not operate if the attachment is not one associated with that user. Similarly, if a user attempts to use an attachment that is not configured to work with that personal care device, the personal care device, e.g., upon failing to identify or synchronize with the attachment, could provide feedback to the user by means of visual, audio, or haptic feedback, or otherwise not operating to prevent damage to the personal care device.

According to one method, each user is provided with a unique user identifier/number that is associated with a user profile that is stored in the personal care device 10 and that has user-specific characteristics associated with each user profile. So, for example, if a first user of the personal care device is identified as User 1, there are also certain output characteristics associated with that user, such as the color red, or a particular audio signal, which will act as output characteristics for the indicator 30. When a new one of the attachments 14 is attached to the personal care device 10, the user would be able to select and assign the new attachment to their user profile, thus associating the ID of the attachment with the user number or identifier corresponding to their profile. In other words, a user could have a profile that includes both a unique user number and unique IDs for each of the attachments 14 associated with their profile. Tracked usage data, user preferences, and the output characteristics would also be associated with the profile, and thus, with the attachments associated with the profile. In this way, each time the attachment is connected to the personal care device 10, the appropriate identification output characteristics for User 1 (as recorded in the profile for User 1) could be automatically implemented as long as the personal care device 10 identifies a match between the ID of the attachment and user's profile and/or user number.

Tables 1A and 1B are included below to further facilitate understanding of the methods described herein according to one embodiment. More particularly, Table 1A indicates how each attachment can be provided with a user number, e.g., implemented with an RFID or NFC tag (and associated with or corresponding to the ID element 22, such as a QUID of each attachment).

TABLE 1A

| User Number (e.g., NFC or RFID tag) | Meaning/Definition |
|---|---|
| 0x00 | Not associated |
| 0x01 . . . 0x07 | User 1 . . . User 7 ('red', 'yellow', 'green', 'blue', etc.) |

Table 1B provides example code snippets that could be used by the personal care device 10, e.g., implemented by the controller 25, in order to make determinations as to the ownership and/or usage status of the attachments, wherein "attachment.usernr" is a user number associated with the attachment (e.g., per Table 1A), "app.usernr" is a user or profile number associated with the user and stored by an application of a remote device (e.g., the application 70), and "attachment.wear" is data that represents a usage history of the attachment (e.g., time of use, age, or number of sessions in which each attachment has been used).

TABLE 1B

| Determination | Example Code |
|---|---|
| New | (attachment.usernr == 0 )AND (attachment.wear == 0) |
| Used but not yet associated to any profile | (attachment.usernr == 0) AND (attachment.wear < > 0) |
| Associated to MY profile | Attachment UUID known by app AND App.usernr == attachment.usernr |
| Associated to OTHER profile | (attachment.usernr != 0) AND ( ( attachment UUID not known by app) OR ( App.usernr < > attachment.usernr) ) |

Tables 2A and 2B are included below to further facilitate understanding of the methods described herein according to another embodiment. More particularly, in this embodiment, the personal care device 10 can be adapted to identify the user associated with each attachment as well as usage history by use of auto-incrementing cookies.

TABLE 2A

| User Number (e.g., NFC or RFID tag) | Meaning/Definition |
|---|---|
| 0x00 | Not associated |
| 0xFF | Associated (generic) |

TABLE 2B

| Determination | Example Code |
|---|---|
| New | (attachment.usernr == 0 )AND (attachment.wear == 0) |
| Used but not yet associated to any profile | (attachment.usernr == 0) AND (attachment.wear < > 0) |
| Associated to MY profile | Attachment UUID known by app AND ( App.usernr == attachment.usernr ) # 0xFF only |

TABLE 2B-continued

| Determination | Example Code |
| --- | --- |
| Associated to OTHER profile | (attachment.usernr != 0) AND<br>( ( Attachment UUID not known by app) OR<br>( App.usernr < > attachment. usernr)<br>) |

If the personal care device 10 collects data about use of the attachment, that data can be transmitted (e.g., "downloaded") to the remote device 62, e.g., via the application 70, for later analysis or use by the user, or provided to others such as their healthcare provider, dental professional, etc. A user may access that information directly or may receive reports, updates, or other information from the remote device 62. In one embodiment, the indicator 30 is included on a remote device (e.g., the remote device 62). In one embodiment, the indicator 30 is in communication with a connected lighting system (e.g., via the application 70) or other smart system or appliance, and the connected lighting or other smart system react in accordance with the output characteristic of the indicator 30, e.g., the color of room lights in the room in which the attachment 14 is being used react in accordance with the output characteristics.

In one embodiment, the status indicator 30 is additionally configured to indicate a usage status for the attachments 14 in addition to the output characteristic indicating user ownership. For example, as noted above the data tracked and stored by the personal care device 10 can include the usage history of the attachment 14. In one embodiment, the memory 16 and/or 26 contains an additional re-writeable location dedicated to tallying the time of use (TOU) for the attachment 14. When the personal care device 10 is turned on, or a new attachment is attached, the personal care device 10, e.g., via the controller 25, could either directly read the TOU memory location as above, or read the ID element 22 and lookup the associated TOU memory location in a database or the like.

Operation of the status indicator 30 can accordingly change over time based on the usage history of the attachment. For example, the output of the indicator 30 could change as some parameter related to usage history meets or passes certain preset thresholds. For example, the indicator 30 if in the form of one or more light sources could be slowly dimmed over the course of the useful life of the attachment 14 until it doesn't light up, indicating need for replacement. If the indicator 30 could alternatively be configured to show or indicate a bar, pie, or other shape that gradually decreases in size as the TOU increases past certain pre-set thresholds. In one embodiment, the indicator 30 includes a speaker that plays a different sound, tone, note, or clip as the TOU passes different use thresholds. In one embodiment, the indicator 30 includes a display unit or screen that displays numerically the numbers of days that the attachment has been in use, and/or the number of uses left before replacement is recommended.

FIG. 5 tabularly illustrates an exemplary use scenario in which a plurality of users ("dad", "mom", "son", and "daughter") each use a different attachment. FIG. 5 indicates the "age" (e.g., TOU) of each of the attachments for the different users as well as what the indicator 30 could look like based on the combination of owner and usage history of each of the attachments. For example, the color "red" (e.g., a red light) could be used by the indicator 30 to indicate that the attachment is owned by "dad", while green is used for "mom", pink is used for "son", and blue is used for "daughter". As discussed above, the indicator 30 would be configured to emit light corresponding to each of these users' attachments.

Additionally, the personal care device 10 could be configured to change in some additional way based on a change in the time of use or usage history of the attachments. In the example scenario of FIG. 5, it is assumed that the attachment, e.g., a toothbrush head, is intended to be used for a total of about 90 days, and therefore several different thresholds can be set between 0 and 90 days, such as at 30 days, 45 days, 60 days, and 75 days, although any other thresholds or number of thresholds could be selected as desired. In this way, the attachment belonging to "dad" is identified by the personal care device 10 as "new", e.g., has not yet been used, and therefore the indicator 30 is configured to display or emit a fully illuminated light ring. Since the color associated with "dad" is red, the light ring would be displayed in red, thereby indicating both ownership and usage history. In this example scenario, the attachment associated with "mom" is identified as being in use for 43 days, which has passed the first threshold, and therefore only three-quarters of the ring are illuminated (e.g., in green, corresponding to the color associated with "mom"). The attachment associated with "son" has reached the next threshold, and therefore only one half of the light ring are illuminated (e.g., in pink), while the attachment associated with "daughter" has passed another usage threshold and therefore only a single quadrant is illuminated (e.g., in blue). Once all usage (age) thresholds are passed, the light ring could blink intermittently, pulse in and out, etc., thereby indicating that the attachment should be replaced.

FIG. 6 illustrates another example scenario similar to the scenario depicted in FIG. 5. In this scenario of FIG. 6, the attachments 14 are intended to be replaceable brush heads for an electric toothbrush, and the indicator 30 is accordingly configured as picture or icon that resembles a toothbrush head. Instead of reducing the size of a ring as in the scenario of FIG. 5, the indicator 30 in the example of FIG. 6 decreases the length of the bristles on the toothbrush icon. Thus, as different usage thresholds are passed (e.g., at 30 days, 60 days, 90 days, etc.), the length of the bristles of the toothbrush icon is shortened (e.g., the number of pixels, segments, or LEDs illuminating the bristle portion of the icon could be selectively reduced). The handle portion of the toothbrush icon could be illuminated in the color corresponding to each of the different users, as described above. In this way, both the user associated with the attachments 14 and the usage history of the attachments 14 could be simultaneously indicated by the indicator 30 in this manner. Those of ordinary skill in the art should recognize that FIGS. 5 and 6 present merely two example scenarios and that the indicator 30 could be arranged to depict, display, play, show, or produce any other shape, number, value, symbol, word, picture, sound, or other indication of both the associated user of the attachments 14 as well as the usage history of the attachments 14.

In one embodiment, the personal care device 10 contains programming for a certain number of specific output variations (e.g., different colors or illumination patterns) for the indicator 30 that can be stored in the memory 26 of the body portion 12 and/or written to the memory 16. When an attachment is first used with the personal care device, it will be assigned a specific output characteristic as noted above. When a second new (e.g., unregistered) attachment is first used with the personal care device 10, the user can be presented with the option (e.g., in accordance with the step 50) of assigning it the same output characteristic as the first attachment, or selecting one of the other preprogrammed output variations. A user could select the same output characteristics (e.g., illumination color or pattern) if he or she is the first user that uses multiple different attachments or is replacing an attachment, or the user could select one of the other preprogrammed output characteristics if he or she is a second user.

A variation of this arrangement would work such that the toothbrush handle has a certain number of specific illumination variations that can be written to brush heads. Assume those are assigned/written to different brush heads. When a new brush head is associated with the handle, the handle will assign the illumination variation to the new brush head that was associated with the previous brush head that was closest to the time period of needing replacement according to the tracking on the handle that monitors wear/replacement of brush heads.

In one embodiment, the personal care device 10 is configured to track or monitor a treatment regimen, which may be selected by or assigned to a user. In some embodiments, the regimen may be developed by, or determined in conjunction with, a health care professional. By way of non-limiting example, in the field of dentistry such regimens could include cavity prevention, plaque reduction, improved interdental cleaning, teeth whitening, etc. In one embodiment, the user is presented with a plurality of preset or predetermined regimens, such as directly stored in memory of the personal care device 10, or downloaded or transferred to the personal care device 10 via the remote device 62 and/or the application 70.

The regimens may include certain measurable goals that can be tracked by the personal care device 10, e.g., by comparing the usage history of the attachments 14 to one or more target values, thresholds, or events defined by the regimen. For example, the target events could include using the personal care device 10 for a set number of sequential days, using the personal care device 10 a set number of times each week, using the personal care device 10 for a set amount of time each day, using the personal care device 10 in one or more specific modes of operation, using the personal care device in a specific manner that can be tracked by the personal care device 10 (e.g., using accelerometers and/or other sensors to determine whether the user is cleaning specific areas/surfaces of their teeth if the personal care device 10 is an electric toothbrush), etc.

Similar to the embodiments in which the status indicator 30 is configured to indicate the usage history of the attachments 14, the status indicator 30 can be configured to alternatively, or additionally, indicate the status or progress of the chosen regimen in any manner discussed herein (e.g., sound, visual, haptic feedback, etc.). In one embodiment, the status indicator 30 includes a light source used to illuminate a ring, symbol, or area of the personal care device 10 (e.g., such as the ring shown in FIG. 5), which becomes increasingly illuminated as progress is made toward one or more goals of the regimen. For example, in one embodiment a regimen may include using the personal care device each day for a week, and the personal care device 10 may be arranged such that additional segments of a light ring or other symbol or shape are illuminated for each day in which the personal care device 10 is used. In one embodiment, the indicator 30 is configured to indicate whether proper attachments are being used to complete a regimen, thereby assisting the user with compliance of the requirements of the regimen.

In one embodiment, the regimen requires the use of multiple attachments 14, e.g., arranged for performing different functions related to the treatment. Referring again to an example in which the personal care device 10 takes the form of an electric toothbrush, the regimen may include using both a brush head attachment and a flosser, pick, or interdental cleaning attachment. Advantageously, as described herein, multiple attachments can be separately identified by the personal care device (e.g., via their IDs 22), and the usage history of each of the attachments thereby tracked for comparison to respective goals of the regimen. Additionally, by use of a user number or profile or the like, each of the attachments can be associated with the same user, such that the data of multiple attachments related to the same regimen can also be associated with the appropriate user. As will be appreciated in view of the above, regardless of how often attachments are swapped out, or the number of attachments that a user must use to complete a regimen (and that other users may use with the same body portion 12 of the personal care device 10 to complete their own regimens), the indicator 30 will provide confidence to each user that the correct attachment is being used.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method for identifying an attachment of a personal care device, the method comprising the steps of:
   attaching the attachment containing a memory to a body portion of the personal care device;
   powering up the personal care device;
   retrieving data from the memory of the attachment;
   extracting, from the retrieved data, at least an identification, ID, of the attachment;
   associating an output characteristic of a status indicator of the personal care device that is associated to the ID of the attachment, wherein the status indicator includes one or more light sources, and wherein the output characteristic includes emitting one or more of a plurality of different colors or different light patterns with the one or more light sources, with each different color or different light pattern corresponding to a different user; and operating the status indicator in accordance with the output characteristic.

2. The method of claim 1, further comprising: sending a synchronization signal query to detect whether the attachment is physically coupled to the personal care device.

3. The method of claim 1, wherein the data includes information about a specific user, preferences set by the specific user, usage history of the attachment, usage history of the specific user, or a combination including at least one of the foregoing.

4. The method of claim 3, further comprising: setting a treatment regimen for the specific user; comparing one or more target values, thresholds, goals, or events defined by the treatment regimen to the usage history of the attachment, the usage history of the specific user, or a combination including at least one of the foregoing, and operating the status indicator to also indicate a status or progress of the treatment regimen.

5. The method of claim 1, wherein the status indicator is configured to produce audio, visual, or haptic feedback signals and the output characteristic may be made permanently or temporarily available to a user of the personal care device.

6. The method of claim 1, wherein the step of associating includes assigning the ID of the attachment to a user number or user profile that is associated with the output characteristic.

7. The method of claim 1, further comprising communicating with the personal care device using a remote device separate from the personal care device.

8. The method of claim 7, wherein the remote device is a smartphone, a smartwatch, a mobile computing device, a charging unit for the personal care device, a computer, a tablet, a server, or a combination including at least one of the foregoing.

9. The method of claim 7, wherein the remote device includes a software application and the method further comprises communicating with the personal care device for retrieving the data.

10. The method of claim 1, wherein the status indicator is within the attachment.

11. A method for associating a removable attachment of a personal care device with an individual user, the method comprising the steps of:

retrieving data from a memory of the removable attachment, the data including at least an identification, ID, of the removable attachment;

assigning an output characteristic of a status indicator of the personal care device to the ID of the attachment, wherein the status indicator includes one or more light sources, and wherein the output characteristic includes emitting one or more of a plurality of different colors or different light patterns with the one or more light sources, with each different color or different light pattern corresponding to a different user; and operating the status indicator in accordance with the output characteristic when the removable attachment is coupled to a body portion of the personal care device.

12. A personal care device comprising:

a plurality of removable attachments, each of the attachments having a memory on which data is stored that includes at least an identification, ID, of each of the attachments, each of the IDs differing from each other; and a status indicator operational according to multiple different output characteristics, wherein the status indicator includes one or more light sources, and wherein the output characteristic includes emitting one or more of a plurality of different colors or different light patterns with the one or more light sources, with each different color or different light pattern corresponding to a different user;

wherein the personal care device is configured to associate a different one of the output characteristics to each of the IDs, and to operate the status indicator in accordance with each of the output characteristics when a corresponding one of the attachments is coupled to a body portion of the personal care device.

13. The personal care device of claim 12, wherein the personal care device includes an electronic toothbrush and the attachments includes different brush heads.

14. The personal care device of claim 12, wherein the personal care device is configured to communicably interface with a software application installed on a remote device for retrieving the data, rewriting the data, or a combination including at least one of the foregoing.

* * * * *